United States Patent
Heap et al.

(10) Patent No.: US 9,216,727 B2
(45) Date of Patent: Dec. 22, 2015

(54) METHOD AND APPARATUS FOR CONTROLLING A MULTI-MODE POWERTRAIN SYSTEM

(71) Applicant: GM GLOBAL TECHNOLOGY OPERATIONS LLC, Detroit, MI (US)

(72) Inventors: Anthony H. Heap, Ann Arbor, MI (US); Kee Yong Kim, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 19 days.

(21) Appl. No.: 14/153,231

(22) Filed: Jan. 13, 2014

(65) Prior Publication Data

US 2015/0197232 A1   Jul. 16, 2015

(51) Int. Cl.
*B60W 10/08* (2006.01)
*B60W 20/00* (2006.01)
*B60W 10/06* (2006.01)

(52) U.S. Cl.
CPC ............... *B60W 10/08* (2013.01); *B60W 10/06* (2013.01); *B60W 20/10* (2013.01); *Y10S 903/902* (2013.01)

(58) Field of Classification Search
CPC ..... B60W 10/06; B60W 10/11; B60W 20/00; Y01S 903/902
USPC ........ 701/22, 54, 67; 477/3, 115; 180/65.265; 903/930
See application file for complete search history.

(56) References Cited

U.S. PATENT DOCUMENTS

| 5,846,155 A * | 12/1998 | Taniguchi et al. ............... 477/2 |
| 7,160,224 B2 * | 1/2007 | Hsieh et al. ...................... 477/3 |
| 2002/0065162 A1 * | 5/2002 | Kaneko et al. .................. 475/2 |
| 2011/0319211 A1 * | 12/2011 | Si .................................... 475/5 |

* cited by examiner

*Primary Examiner* — Tan Q Nguyen

(57) ABSTRACT

A method for operating a multi-mode powertrain system includes executing a selection scheme to evaluate operating the powertrain system in a plurality of candidate powertrain states including a one-motor electric vehicle (EV) range responsive to an output torque request. A respective minimum cost for operating the powertrain system in each of the candidate powertrain states including the one-motor EV range is determined. A preferred powertrain state is selected as one of the candidate powertrain states including the one-motor EV range that is associated with a minimum of the respective minimum costs. The powertrain system is controlled in the preferred powertrain state responsive to the output torque request.

8 Claims, 3 Drawing Sheets

METHOD AND APPARATUS FOR CONTROLLING A MULTI-MODE POWERTRAIN SYSTEM

TECHNICAL FIELD

This disclosure is related to multi-mode powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A method for operating a multi-mode powertrain system includes executing a selection scheme to evaluate operating the powertrain system in a plurality of candidate powertrain states including a one-motor electric vehicle (EV) range responsive to an output torque request. A respective minimum cost for operating the powertrain system in each of the candidate powertrain states including the one-motor EV range is determined. A preferred powertrain state is selected as one of the candidate powertrain states including the one-motor EV range that is associated with a minimum of the respective minimum costs. The powertrain system is controlled in the preferred powertrain state responsive to the output torque request.

BRIEF DESCRIPTION OF THE DRAWINGS

One or more embodiments will now be described, by way of example, with reference to the accompanying drawings, in which.

DETAILED DESCRIPTION

Figure 1:
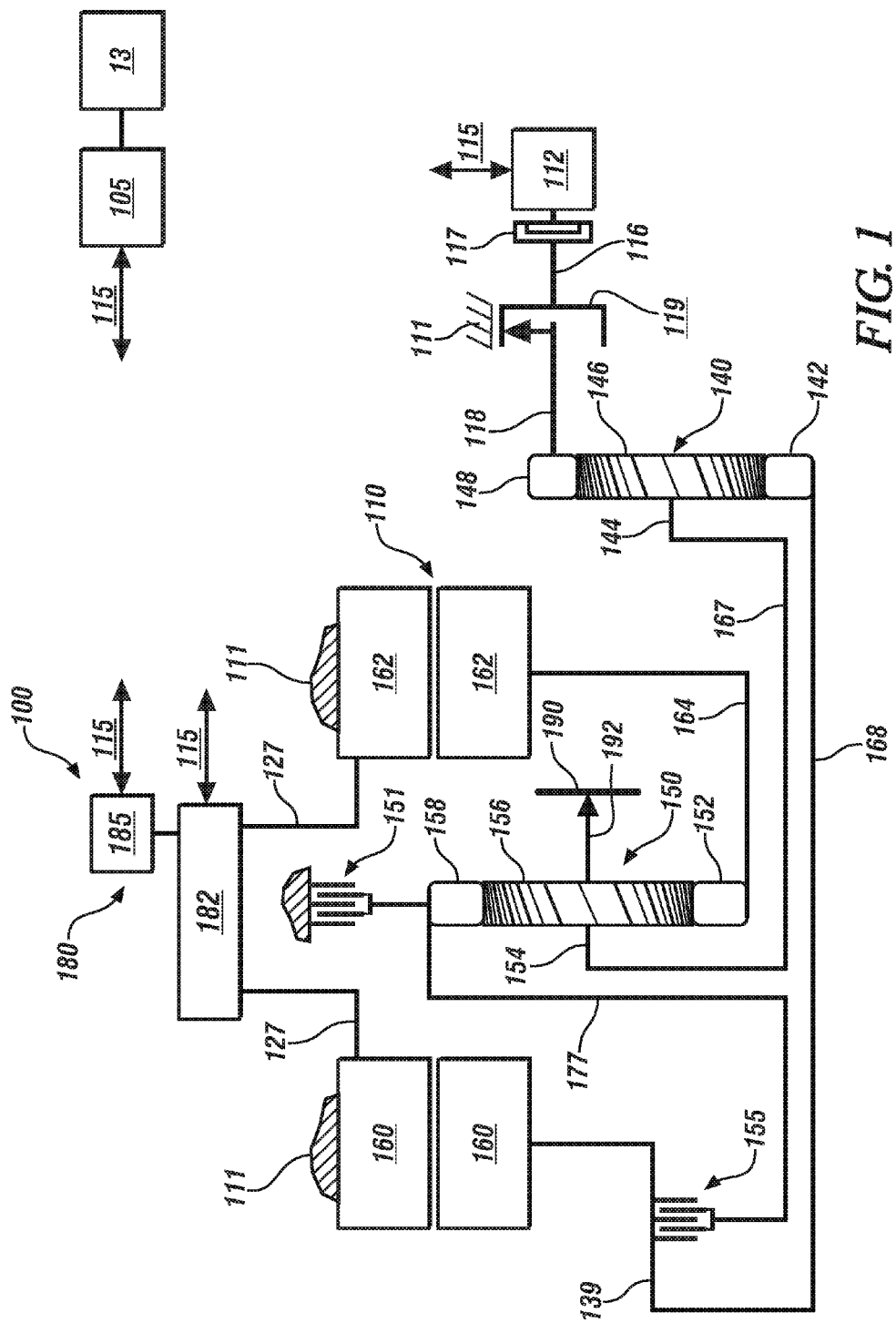
FIG. 1 illustrates a multi-mode powertrain system including an internal combustion engine, a multi-mode transmission, a high-voltage electrical system, and a driveline configured with a front-wheel drive transaxle, in accordance with the disclosure.

Referring now to the drawings, wherein the showings are for the purpose of illustrating certain exemplary embodiments only and not for the purpose of limiting the same, FIG. 1 depicts a non-limiting multi-mode powertrain system 100 including an internal combustion engine (engine) 112, a multi-mode transmission (transmission) 110, a high-voltage electrical system 180, a driveline 190, and a controller 105. The transmission 110 mechanically couples to the engine 112 and first and second torque machines 160 and 162, respectively, and is configured to transfer torque between the engine 112, the torque machines 160, 162, and the driveline 190. As illustrated, the first and second torque machines 160, 162 are electric motor/generators. A user interface 13 signally connects to the controller 105. The driveline 190 includes a transaxle system that facilitates a front-wheel drive vehicle configuration.

The engine 112 may be any combustion device that generates torque. The engine 112 can include a multi-cylinder internal combustion engine that is either a spark-ignition or a compression-ignition engine. The controller 105 is configured to control actuators of the engine 112 to control combustion parameters including intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 114 by controlling motor torques of first and second torque machines 160 and 162, respectively. The engine 112 is configured to operate in an ON state or be in an OFF state during ongoing powertrain operation through execution of autostop and autostart control routines. The engine 112 includes shaft 116 that mechanically couples to an input member 118 of the transmission 110 through a damper device 117, e.g., a torque converter and a mechanical diode 119. Engine speed and engine torque can differ from input speed and input torque to the transmission 110 due to placement and operation of torque-consuming components on the input member between the engine 112 and the transmission 110, e.g., the torque converter 117 or a mechanically-powered hydraulic pump. Engine speed and engine torque can differ from the input speed and input torque to the transmission 110 by decoupling the input member 118 of the transmission 110 from the shaft 116 of the engine 112, e.g., by activation of the mechanical diode 119 in a selected state.

The mechanical diode 119 and torque converter 117 operate to mechanically couple or decouple the shaft 116 of the engine 112 and the input member 118 of the transmission 110. The mechanical diode 119 is a selectable one-way clutch in one embodiment. The mechanical diode 119 between the engine 112 and the transmission 110 permits the engine 112 to transfer torque to the transmission 110 in a first rotational direction when activated in a first state. The mechanical diode 119 grounds rotation of the engine 112 to a transmission case 111 when the engine 112 is in an OFF state and permits the input member 118 to free-wheel spin independently from the shaft 116 of the engine 112 when activated in a second state.

The exemplary transmission 110 is a two-mode, compound-split, electro-mechanical transmission 110 that includes two planetary-gear sets 140 and 150, and two engageable torque-transferring devices, i.e., clutches C1 151 and C2 155. Other embodiments of the transmission are contemplated. The planetary gear set 140 includes a sun gear member 142, a ring gear member 148, and planet gears 146 coupled to a carrier member 144. The carrier member 144 rotatably supports the planet gears 146 that are disposed in meshing relationship with both the sun gear member 142 and the ring gear member 148, and couples to rotatable shaft member 167. The input member 118 rotatably couples to the ring gear member 148. The sun gear 142 rotatably couples to shaft member 168. The planetary gear set 150 includes a sun gear member 152, a ring gear member 158, and planet gears 156 coupled to a carrier member 154. The planet gears 156 are disposed in meshing relationship with both the sun gear member 152 and the ring gear member 158. The carrier member 154 couples to the rotatable shaft member 167. The sun gear member 152 couples via shaft member 164 to a rotor of the second torque machine 162. The ring gear member 158 couples to the second clutch C2 155. The ring gear member 158 also couples to rotatable shaft member 177 that couples to one side of the first clutch C1 151. The second clutch C2 155 is a brake clutch that grounds the ring gear member 158 and the rotatable shaft member 177 to transmission ground 111. A second side of the first clutch C1 151 couples to a shaft member 139 that is rotatably coupled to shaft member 168 and also rotatably coupled to a rotor of the first electric machine 160. The output member 192 is rotatably connected to the driveline 190 to provide output power to the driveline 190 in the form of torque and rotational speed that is transferred to one or a plurality of vehicle wheels via a transaxle or another device in this embodiment. The aforementioned controller 105 communicates with other control modules, sensors, and actuators via a communications link 115, which effects structured communication between the various control modules. The specific communication protocol is application-specific.

The first and second torque machines 160 and 162 are three-phase AC motor/generator machines, each including a stator, a rotor, and a resolver. The motor stator for each of the torque machines 160, 162 is grounded to an outer portion of the transmission case 111, and includes a stator core with coiled electrical windings extending therefrom.

The high-voltage electrical system 180 includes an electrical energy storage device, e.g., a high-voltage battery (battery) 185 electrically coupled to a transmission power inverter control module (TPIM) 182, and is configured with devices for monitoring electric power flow including devices and systems for monitoring electric current and voltage. The TPIM 182 includes three-phase inverters configured to receive or supply DC electric power via DC transfer conductors and transform it to or from three-phase AC power, which is conducted to or from the first and second torque machines 160 and 162 for operation as motors or generators via transfer conductors 127. The battery 185 can be any high-voltage electrical energy storage device, e.g., a high-voltage battery, and preferably includes a monitoring system that provides a measure of electrical power supplied to the high-voltage bus electrical 84, including voltage and electric current.

The torque transfer clutches, i.e., clutches C1 151 and C2 155 are torque transfer devices that can be selectively activated and deactivated in response to a control signal, and may include by way of example single or compound plate clutches or packs, one-way clutches, band clutches, and brakes. In one embodiment, a hydraulic circuit is configured to control clutch states of each of the clutches, with pressurized hydraulic fluid supplied by an electrically-powered hydraulic pump that is operatively controlled by the controller 105. Clutch C2 155 is a hydraulically-applied rotating friction clutch. Clutch C1 151 is a hydraulically-controlled brake device that can be grounded to the transmission case 111.

The controller 105 signally and operatively links to various actuators and sensors in the powertrain system via a communications link 115 to monitor and control operation of the powertrain system, including synthesizing information and inputs, and executing algorithms to control actuators to meet control objectives related to fuel economy, emissions, performance, drivability, and protection of hardware, including batteries of battery 185 and the first and second torque machines 160 and 162. The controller 105 is a subset of an overall vehicle control architecture, and provides coordinated system control of the powertrain system. The controller 105 may include a distributed control module system that includes individual control modules including a supervisory control module, an engine control module, a transmission control module, a battery pack control module, and the TPIM 182.

User interface 13 is preferably signally connected to a plurality of devices through which a vehicle operator directs and commands operation of the powertrain system, including commanding an output torque request and selecting a transmission range. The devices preferably include an accelerator pedal, an operator brake pedal, a transmission range selector (PRNDL), and a vehicle speed cruise control system. The transmission range selector may have a discrete number of operator-selectable positions, including indicating direction of operator-intended motion of the vehicle, and thus indicating the preferred rotational direction of the output member 192 of either a forward or a reverse direction. It is appreciated that the vehicle may still move in a direction other than the indicated direction of operator-intended motion due to rollback caused by location of a vehicle, e.g., on a hill. The operator-selectable positions of the transmission range selector can correspond directly to individual transmission ranges described with reference to Table 1, or may correspond to subsets of the transmission ranges described with reference to Table 1. The user interface 13 preferably includes a plurality of user interface devices directly connected to individual control modules.

The aforementioned control modules communicate with other control modules, sensors, and actuators via the communications link 115, which effects structured communication between the various control modules. The specific communication protocol is application-specific. The communications link 115 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals referred to as loop cycles, for example each 100 microseconds or 3.125, 6.25, 12.5, 25 and 100 milliseconds during ongoing engine and vehicle operation. Alternatively, routines may be executed in response to occurrence of an event.

The multi-mode powertrain 100 is configured to operate in one of a plurality of powertrain states that are described with reference to Table 1. The powertrain states include a plurality of transmission ranges and engine states to generate and transfer torque to the driveline 190. The engine states include an ON state and an OFF state. The engine is considered to be in the ON state when spinning The engine ON state may include an all-cylinder state (ALL) wherein all cylinders are fueled and firing to generate torque, and a cylinder-deactivation state (DEAC) wherein a portion of the cylinders are fueled and firing to generate torque and the remaining cylinders are unfueled, not firing and not generating torque. The engine ON state further includes a fuel cutoff (FCO) state, wherein all of the cylinders are unfueled, not firing and not generating torque. The FCO state can be commanded in response to an operator command for vehicle deceleration, such as occurs when the operator lifts their foot from the accelerator pedal, referred to herein as a decel-fuel cutoff state (dFCO). The engine can be commanded to operate in the FCO state under other non-deceleration operating conditions.

The engine 112 is considered to be in the OFF state when not spinning In one embodiment, engine rotation is grounded to the transmission case 111 using clutch 119 when the engine is in the OFF state. The input member 118 may rotate freely when the engine is in the OFF state, depending upon the state of the clutch 119. During operation with the engine in the OFF state, speeds and torque outputs of the first and second torque machines 160, 162 controlled to achieve an output speed and output torque that is responsive to the output torque request. Alternatively or in addition, operating with the engine in the OFF state can be accomplished by controlling rotational speeds of the torque machines to achieve an input speed that is zero and an output speed and output torque that are responsive to the output torque request. The output torque request includes a positive output torque request leading to vehicle acceleration and/or steady-state cruising operation.

Table 1 depicts a plurality of transmission ranges and engine states for operating the multi-mode powertrain 100. When the multi-mode powertrain 100 includes the input member 118 and the mechanical diode 119 between the engine 112 and the transmission 110, the multi-mode powertrain 100 is configured to operate in one of a plurality of powertrain states that are described with reference to Table 1 and Table 2. The powertrain states include a plurality of transmission ranges and engine states to generate and transfer torque to the driveline 190. The engine states include an ON state, an OFF state, and a fuel cutoff (FCO) state. The transmission ranges can include neutral (Neutral), fixed gear (Gear #), variable mode (EVT Mode #), electric vehicle (EV#) and transitional (Pseudo-gear #) ranges that are achieved by selectively activating the clutches C1 151 and C2 155 and the mechanical diode 119. The mechanical diode 119 is designated as clutch C3.

TABLE 1

| Range | Engine State | C1 | C2 | C3 |
|---|---|---|---|---|
| Neutral | ON(ALL/DEAC/FCO) | | | |
| Pseudo-gear 1 | ON(ALL/DEAC/FCO) | | | |
| EVT Mode 1 | ON(ALL/DEAC/FCO) | x | | |
| EVT Mode 2 | ON(ALL/DEAC/FCO) | | x | |
| Gear 1 | ON(ALL/DEAC/FCO) | x | x | |
| EV1 | OFF | x | | x |
| EV2 | OFF | | x | x |

A pseudo-gear range is a variable mode transmission range in which magnitude of torque output from the transmission to the driveline correlates to magnitude of the engine input torque, taking into account torque losses associated with torque-consuming components on the input member 118. The pseudo-gear range(s) can be employed as intermediate transmission ranges during shifts between EVT Mode ranges, and can also be employed as steady-state transmission operating states.

The multi-mode powertrain system 100 is further configured to operate in an operating mode referred to herein as a one-motor EV mode. The one-motor EV mode includes the following in Table 2.

TABLE 2

| Range | Engine State | C1 | C2 | C3 |
|---|---|---|---|---|
| one-motor EV | OFF | | | x |

Operation in the one-motor EV mode includes operating the powertrain system 100 with both clutches C1 151 and C2 155 deactivated, with clutch C3 119 grounded against the transmission case 111 with the engine 112 in the OFF state, and one of the torque machines 160, 162 generating tractive torque responsive to an output torque request while the other of the torque machines 160, 162 is commanded to generate zero torque, i.e., free-wheeling. In one embodiment, the first torque machine (motor A) 160 is employed to generate tractive torque and the second torque machine (motor B) 162 free-wheels. The mechanical diode, i.e., clutch C3 119 locks the input member 118 to rotate in concert with the engine 112.

Benefits of operating in the one-motor EV mode include reducing electric power consumption due to reduced inverter switching losses associated with operating only one of the torque machines because the inverter switches associated with the free-wheeling second torque machine are inactive. Furthermore, transmission spin losses are reduced when both clutches C1 151 and C2 155 are slipping, permitting the transmission 110 to achieve an equilibrium point. Maximum torque output from the transmission is limited to the maximum torque capability of the selected one of the torque machines while operating in the one-motor EV mode. A power cost of operating in the one-motor EV mode includes a power requirement and an elapsed time requirement associated with activating one or both the clutches C1 151 and C2 155 in response to a command to exit the one-motor EV mode and operate in one of the EV, EVT, or Gear modes. Activating one of the clutches C1 151 and C2 155 includes executing an inertia speed phase and a torque phase. Executing the inertia speed phase includes synchronizing speeds of the clutch elements by transitioning one or both elements of the oncoming clutch from an initial speed to a target speed while maintaining speed of the output member 192 of the transmission 110 at a speed that is responsive to the output torque request and maintaining torque of the output member 192 of the transmission 110 at a torque magnitude that is responsive to the output torque request. This is accomplished by controlling speeds of one or both the first and second torque machines 160, 162. Executing the torque phase includes increasing a clamping force between plates of the oncoming clutch while maintaining speed of the output member 192 of the transmission 110 at a speed that is responsive to the output torque request and maintaining torque of the output member 192 of the transmission 110 at a torque magnitude that is responsive to the output torque request without causing slippage across the oncoming clutch.

Governing torque equations for operating in the one-motor EV mode include the following, when motor A is employed to generate tractive torque and motor B free-wheels.

$$Ta = a1*(To) + 0*(Nj\_dot) + c1*(No\_dot) + 0*(Nj) + 0*(No)$$

$$Tb = 0*(To) + b2*(Nj\_dot) + c2*(No\_dot) + d2*(Nj) + e2*(No) \quad [1]$$

wherein Ta is Motor A torque,
Tb is Motor B torque,
To is the output torque,
Nj_dot is clutch slip acceleration and relates to inertia,
No_dot is output acceleration and relates to inertia,
Nj is clutch slip speed and relates to spin losses,
No is output speed and relates to spin losses, and
a1, c1, b2, c2, d2 and e2 are system-specific scalar values.

Governing speed equations for operating in the one-motor EV mode include the following, when motor A is employed to generate tractive torque and motor B free-wheels.

$$Na = x1*(No)$$

$$Nb = x2*(Nc2) - y2*(No)$$

$$Nc1 = Nc2 + y3*(No) \quad [2]$$

wherein Na is Motor A speed,
Nb is Motor B speed,
Nc1 is clutch slip speed of the first clutch C1,
Nc2 is clutch slip speed of the second clutch C2,
No is output speed, and
x1, x2, y2 and y3 are system-specific scalar values.

In operation, a single one or a plurality of control routines is executed in one of the control modules to operate an embodiment of the multi-mode powertrain system 100 described with reference to FIG. 1 to transfer torque between the engine 112, the multi-mode transmission 110, the torque machines 160, 162, and the driveline 190. Such operation includes executing a selection scheme to evaluate operating the powertrain system in a plurality of candidate powertrain states including a one-motor electric vehicle (EV) range responsive to an output torque request. A respective minimum cost is determined for operating the powertrain system in each of the candidate powertrain states including the one-motor EV range. A preferred powertrain state is selected, and is the candidate powertrain state, possibly including the one-motor EV range that is associated with a minimum of the respective minimum costs. The powertrain system is controlled in the preferred powertrain state responsive to the output torque request. Details of this operation are described with reference to FIGS. 2 and 3.

Figure 2:
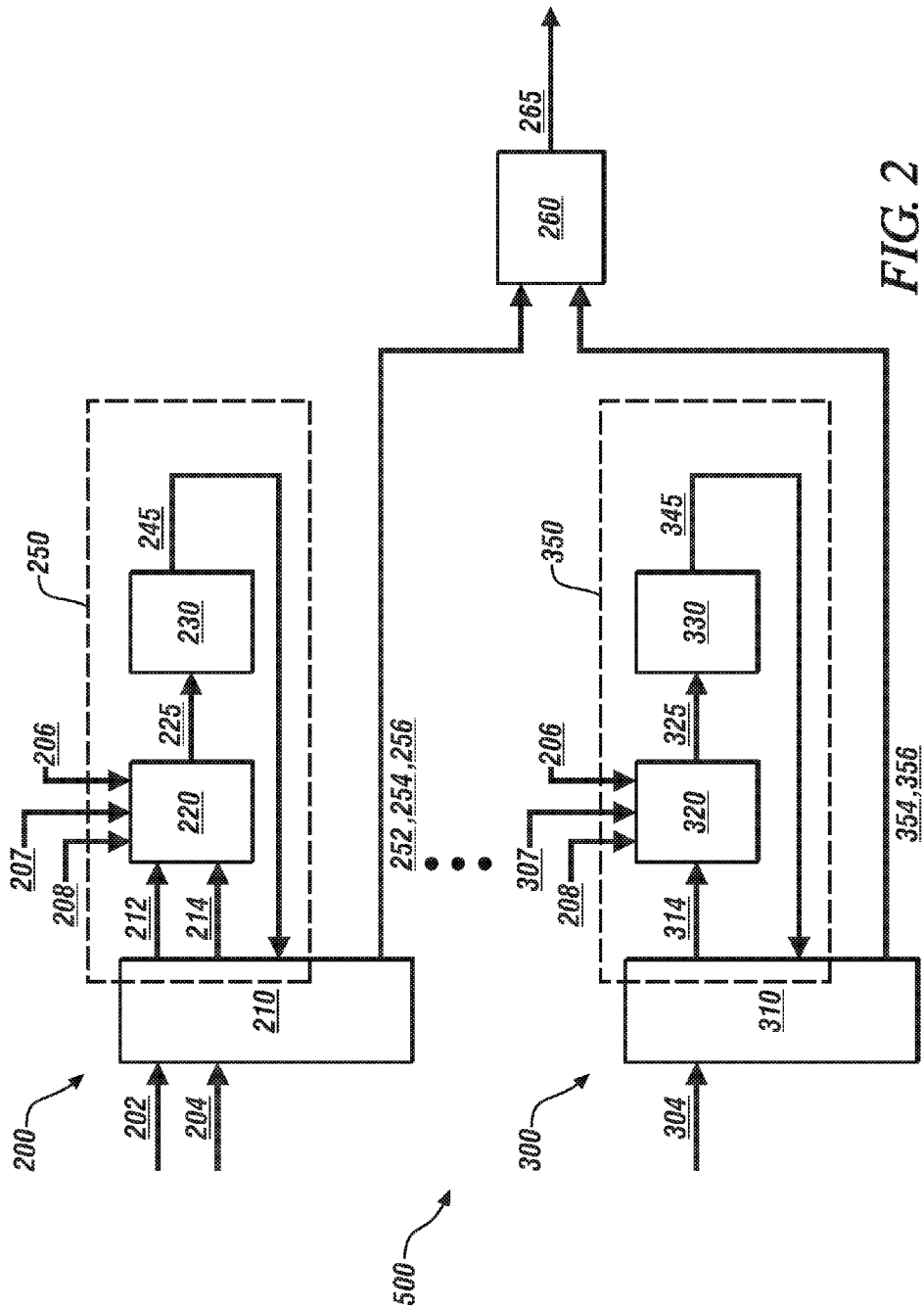
FIG. 2 illustrates a search scheme for determining preferred engine operating parameters when operating an embodiment of the multi-mode powertrain system in response to an output torque request, in accordance with the disclosure.

FIG. 2 schematically shows a transmission range selection scheme 500 including a plurality of search schemes 200 . . . and a one-motor EV mode search scheme 300. Each of the search schemes 200, . . . employs a search engine 210 to search within a search window to identify a power cost and corresponding preferred powertrain states responsive to a first parameter and a second parameter when the powertrain system is operating with the transmission controlled in one of the candidate transmission ranges 207 in response to an output torque request 206 and powertrain system operating parameters 208. The search schemes 200 can be a zero-dimensional, one-dimensional (single parameter), two-dimensional (two parameters), or other multi-dimensional (multiple parameters) search windows, depending upon whether the candidate transmission range 207 is one of the EVT modes, the gear range, or the engine is OFF. The depicted search scheme 200 is a two-dimensional search scheme 200 including a first parameter 202 and a second parameter 204 for operating the powertrain system with the transmission controlled in one of the candidate transmission ranges 207 in response to an output torque request 206. A minimum power cost 256 is shown with corresponding preferred states 252 and 254 for the first and second parameters 202 and 204, respectively.

Each of the search schemes 200, . . . employs the search engine 210 to search within a predetermined search window while operating the powertrain system with the transmission controlled in one of the candidate transmission ranges 207 in response to an output torque request 206. A minimum power cost 256 and preferred states, e.g., states 252 and 254 are determined for the control parameters, e.g., parameters 202 and 204 for each of the search schemes 200, . . . .

The candidate transmission ranges 207 include all or a portion of the EVT, EV, Gear, Neutral and pseudo-gear modes described with reference to Table 1. When operating in one of the EVT modes, the EV modes, and the Gear mode, the first and second parameters 202 and 204 include an input speed range and an input torque range, and the preferred states 252 and 254 include a preferred input speed and a preferred input torque, respectively. When operating in one of the Neutral and pseudo-gear modes, the first and second parameters 202 and 204 include the input speed range and a clutch slip speed range, and the preferred states 252 and 254 include the preferred input speed and a preferred clutch slip speed, respectively. When operating the engine in the all-cylinder state, the input speed range traverses from engine idle speed, e.g., 800-1000 RPM, to a maximum achievable engine speed, i.e., redline. The maximum achievable input speed is specific to an engine configuration and can be in the range of 5000 RPM to 8000 RPM. When operating the input in the cylinder deactivation state, the input speed range traverses between a minimum speed, e.g., 1000 RPM, and a threshold maximum cylinder deactivation engine speed, which may be less than the maximum achievable input speed in the all-cylinder state, and is specific to an engine configuration. As shown, the threshold cylinder deactivation input speed is 3000 RPM. The clutch slip speed range traverses between a minimum allowable slip speed and a maximum allowable slip speed.

The search scheme 300 employs a search engine 310 to search within a predetermined one-dimensional search window including a first parameter 302, e.g., Nb (Motor B speed), NC1 (clutch C1 speed), or NC2 (clutch C2 speed) while operating the powertrain system with the one-motor EV range with the input speed equal to 0 RPM as a candidate transmission range 307 in response to the output torque request 206. A minimum power cost 356 and corresponding magnitude of the first parameter, e.g., clutch slip speed are determined by the search scheme 300.

The transmission range selection scheme 500 selects a candidate transmission range based upon a minimum of the power costs 256, . . . 356 for each of the candidate transmission ranges when operating the powertrain system 100 in response to the output torque request 206 and output speed taking into account powertrain system operating parameters 208, as shown. The search schemes 200, . . . 300 are preferably executed simultaneously, i.e., within the same loop cycle. One of the search schemes 200 is shown, but it is appreciated that the quantity of search schemes can be any number consistent with the quantity of available transmission ranges. A selection/arbitration scheme 260 identifies either one of the candidate transmission ranges 207 or the one-motor EV range 307 as a preferred range, and controls operation of the multi-mode powertrain system 100 in response.

The first parameter range 202 and the second parameter range 204 are provided to the two-dimensional search engine (search engine) 210. By way of example the first parameter range 202 is described as the input speed range and the second parameter range 204 is described as the torque range. The search engine 210 iteratively generates a plurality of candidate first parameter states 212, e.g., input speeds Ne(j) across the input speed range 202 and a plurality of candidate second parameter states 214, e.g., input torques Te(j) across the input torque range 204, each which is input to an iteration loop 250. The designation (j) indicates an individual iteration. The iteration loop 250 employs a system torque determination scheme 220, and a cost model 230 to calculate a candidate power cost Pcost(j) 245 for each combination of the candidate first and second parameter states 212 and 214.

The search engine 210 monitors the candidate power costs Pcost(j) 245 for all iterations. The candidate first and second parameter states 212, 214 that achieve a minimum of the candidate power costs Pcost(j) 245 are selected by the search engine 210 as the preferred first and second parameter states 252 and 254. The minimum cost 256 and corresponding preferred first and second parameter states 252 and 254 are identified based upon execution of a plurality of iteration loops across the input speed range and input torque range. Similarly, when the first parameter range 202 is the input speed range and the second parameter range 204 is the clutch slip speed, the search engine 210 iteratively generates a plurality of candidate input speeds Ne(j) across the input speed range 202 and a plurality of candidate clutch slip speeds Ncs(j) across the clutch slip speed range 204, each which is input to the iteration loop 250. A minimum cost 256 and associated preferred parameter states 252 and 254 are identified based upon execution of a plurality of iteration loops across the input speed range and clutch slip speed range.

The system torque determination scheme 220 determines a candidate powertrain operating point 225, including motor torque commands Ta, Tb for the first and second torque machines to achieve the output torque request To 206 in response to the candidate input speed state Ne(j) 212 and the candidate input torque state Te(j) 214 when operating in the candidate transmission range 207 and based upon the powertrain system operating parameters 208. The powertrain system operating parameters 208 include operating limits for the first and second torque machines, e.g., minimum and maximum torques and minimum and maximum speeds, and operating limits for the battery, e.g., battery power limits including maximum discharge limits and maximum charge limits. The candidate powertrain operating point 225 includes preferred operating parameters for the first and second torque machines, e.g., torque and speed, and preferred operating parameters for the battery, e.g., battery power, in response to the output torque request 206 when the engine is operating at the candidate first parameter state 212 and the candidate second parameter state 214 and the transmission is operating in the candidate transmission range 207.

The cost model 230 determines a candidate power cost P(j) 245 for operating the powertrain at the candidate powertrain operating point 225. An exemplary power cost function is described with reference to FIG. 3. The search scheme 200 determines a minimum power cost 256 and corresponding preferred first and second parameter states 252, 254 when operating the powertrain system 100 in response to the output torque request 206 with the transmission 10 in the candidate transmission range 207.

The one-motor EV search scheme 300 operates as follows. The first parameter range 304 is provided to the one-dimensional search engine (search engine) 210. By way of example and as described herein, the first parameter range 304 is a clutch slip speed range, or, alternatively, motor B speed. The clutch slip speed range 304 is associated with rotational speed of one of the first and second clutches C1 151 and C2 155. The search engine 310 iteratively generates candidate clutch slip speed states Nc(j) 314 (or candidate motor B speeds) across the clutch slip speed range 304, each which is input to an iteration loop 350. The designation (j) indicates an individual iteration. The iteration loop 350 employs a system torque determination scheme 320 to determine a candidate powertrain operating point 325 and a cost model 330 to calculate a candidate cost Pcost(j) 345 for each candidate clutch slip speed state Nc(j) 314. The search engine 310 monitors the candidate costs Pcost(j) 345 for all iterations and selects a minimum cost 356. The candidate clutch slip speed state Nc(j) 314 that achieves the minimum cost 356 responsive to the output torque request is selected by the search engine 310 as the preferred clutch slip speed 354 for operating in the one-motor EV range. The minimum cost 356 and corresponding preferred clutch slip speed 354 are identified based upon execution of a plurality of iteration loops across the clutch slip speed range 304.

The system torque determination scheme 320 executes EQ. 1 to determine the candidate powertrain operating point 325, including a preferred motor torque command Ta or Tb for the one of the first and second torque machines that is operational to achieve the output torque request To 306 in response to the candidate clutch slip speed state Nc(j) 314 when operating in the selected one-motor EV range 307 and based upon powertrain system operating parameters 208. The powertrain system operating parameters 208 include operating limits for the first and second torque machines, e.g., minimum and maximum torques and minimum and maximum speeds, and operating limits for the battery, e.g., battery power limits including maximum discharge limits and maximum charge limits. The candidate powertrain operating point 325 includes preferred operating parameters for the first and second torque machines, e.g., torques and speeds, and preferred operating parameters for the battery, e.g., battery power, in response to the output torque request 306 at the candidate clutch slip speed state Nc(j) 314 when the engine is at zero speed and the transmission is operating in the One-motor EV range 307.

The cost model 330 includes a power cost function that determines a candidate cost P(j) 345 for operating the powertrain at the candidate powertrain operating point 325. An exemplary power cost function is described with reference to FIG. 3.

The search engine 310 selects the preferred clutch slip speed 354 based upon the candidate power costs P(j) 345 for all the candidate clutch slip speed states Nc(j) 314 (or candidate motor B speeds). The preferred clutch slip speed 354 is the candidate clutch slip speed state Nc(j) 314 that results in a minimum of the candidate power costs P(j) 345 for operating the multi-mode powertrain system in the selected one-motor EV range 307 in response to the output torque request 206.

The aforementioned minimum power costs 256, . . . 356 associated with the candidate transmission ranges 207, . . . and the candidate one-motor EV range 307 are input to the selection/arbitration block 260, which acts to select the candidate transmission range 207 or candidate one-motor EV range 307 having a minimum of the minimum power costs 256, . . . 356 as a preferred transmission range 265 for controlling the transmission 10 with engine and input member operation controlled employing the corresponding speed 252 and torque 254 or corresponding preferred clutch slip speed 354. The selection/arbitration block 260 employs hysteresis and other tactics to minimize shift busyness.

The multi-mode powertrain system employs the search scheme 500 to control operation in the selected one of the one-motor EV range 307 or the candidate transmission ranges 207 in response to the output torque request 306.

Figure 3:
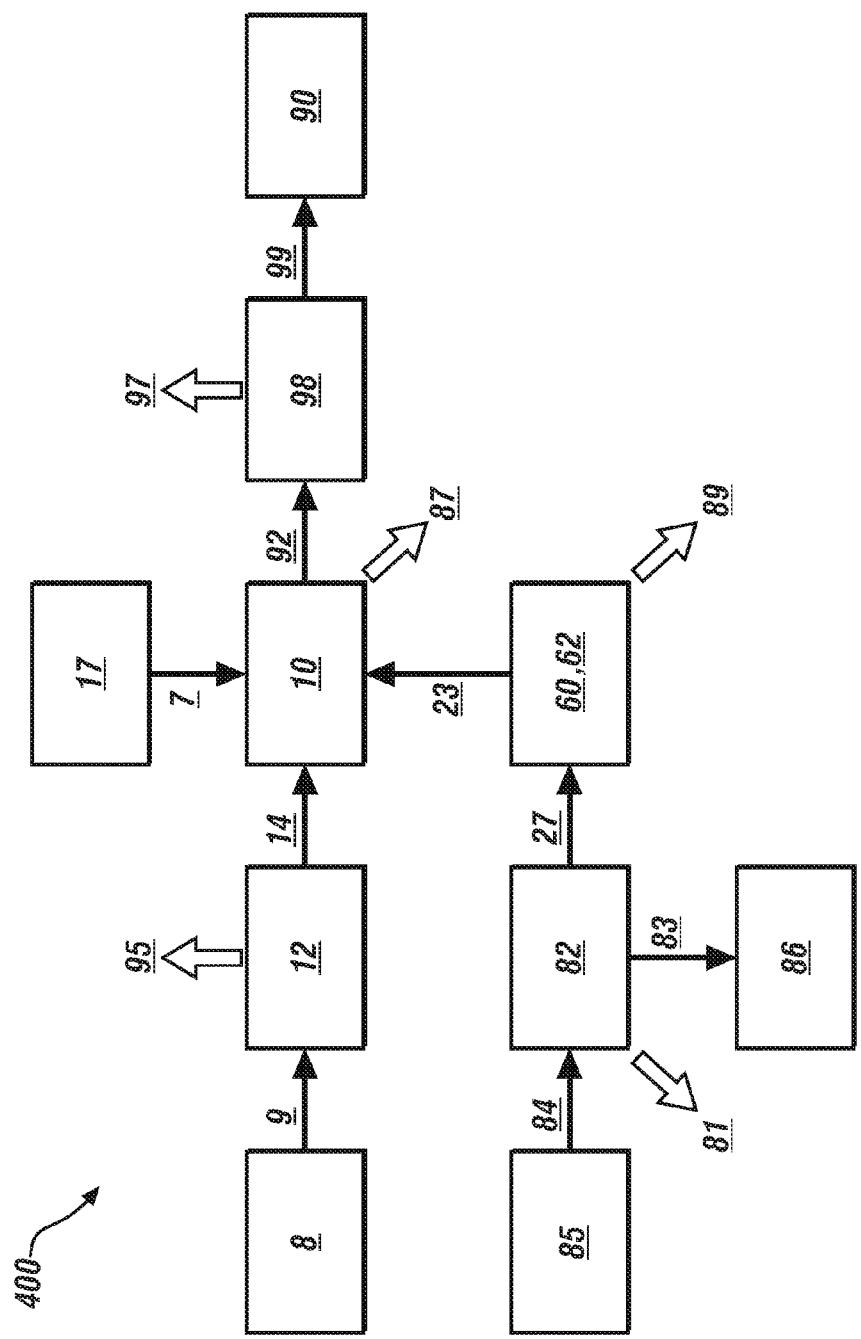
FIG. 3 illustrates a power cost determination function including an analytic framework for determining powertrain system operating costs, in accordance with the disclosure.

FIG. 3 schematically illustrates an exemplary power cost determination function 400 including an analytic framework for determining powertrain system operating costs, which is described with reference to the multi-mode powertrain system 100 described with reference to FIG. 1. Powertrain elements include the engine 12, transmission 10, non-combustion torque machines 60, 62, battery 85, inverter 82, wheel brakes 98, driveline 90, and a fuel storage system 8, which are analogous to corresponding elements shown with reference to FIG. 1. Pseudo-elements include an inertial load 17, which is an element constructed to account for system inertias, and high-voltage electrical load 86, which is an element constructed to account for high-voltage loads in the vehicle outside that load used for propulsion of the powertrain system 100. Power flow paths include a first power flow path 9 from the fuel storage system 8 to transfer fuel power to the engine 12, a second power flow path 14 between the engine 12 and the transmission 10, and third power flow path 84 between the battery 85 and the inverter 82, a fourth power flow path 83 between the inverter 82 and the high-voltage electrical load 86, and fifth power flow path 27 between the inverter 82 and the non-combustion torque machines 60, 62, a sixth power flow path 23 between the non-combustion torque machines 60, 62 and the transmission 10, and seventh power flow path 7 between the inertial load 17 and the transmission 20, an eighth power flow path 92 between the transmission 10 and the wheel brakes 98, and a ninth power flow path 99 to the driveline 90. Power losses include engine power losses 95, battery power losses 81, mechanical power losses 87, electric motor losses 89, and brake power losses 97. The power cost inputs to the power cost determination function 400 are determined based upon factors related to vehicle drivability, fuel economy, emissions, and battery usage. Power costs are assigned and associated with fuel and electrical power consumption and are associated with a specific operating points of the multi-mode powertrain. Lower operating costs can be associated with lower fuel consumption at high conversion efficiencies, lower battery power usage, and lower emissions for each engine speed/load operating point, and take into account the candidate operating state of the engine 14. The power costs may include the engine power losses 95, electric motor power losses 89, battery power losses 81, brake power losses 97, and mechanical power losses 87 associated with operating the multi-mode powertrain at specific operating points for the engine 10 and the non-combustion torque machines 60, 62. The power cost determination function 400 may be employed to determine a total power cost for operating at a selected engine operating point while operating the powertrain system responsive to an output torque request.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a powertrain system including a multi-mode transmission configured to transfer torque among an engine, torque machines, and a driveline, comprising:
 executing a selection scheme including evaluating operating the powertrain system in a plurality of candidate powertrain states including a one-motor electric vehicle (EV) range responsive to an output torque request;
 determining a respective minimum cost for operating the powertrain system in each of the candidate powertrain states including the one-motor EV range;
 selecting a preferred powertrain state comprising one of the candidate powertrain states including the one-motor EV range associated with a minimum of the respective minimum costs; and
 controlling the powertrain system in the preferred powertrain state responsive to the output torque request.

2. The method of claim 1, wherein selecting the preferred powertrain state comprises determining a preferred state for an operating parameter associated with the preferred powertrain state; and
 wherein controlling the powertrain system in the preferred powertrain state responsive to the output torque request comprises controlling the powertrain system in the preferred state for the operating parameter associated with the preferred powertrain state.

3. The method of claim 1, wherein evaluating operating the powertrain system in the one-motor EV range comprises evaluating operating a single one of the torque machines to generate tractive torque responsive to the output torque request while commanding a zero torque output from the other of the torque machines with the engine in an OFF state.

4. The method of claim 3, wherein commanding zero torque output from the other of the torque machines with the engine in the OFF state comprises permitting the other of the torque machines to free-wheel.

5. A method for operating a powertrain system including a multi-mode transmission configured to transfer torque among an engine, first and second torque machines, and a driveline, comprising:
 operating the powertrain system in a one-motor electric vehicle (EV) range responsive to an output torque request including operating only a single one of the torque machines to generate tractive torque responsive to the output torque request;
 wherein operating the powertrain system in the one-motor EV range comprises operating the single one of the torque machines to generate tractive torque responsive to the output torque request while commanding zero torque output from the other of the torque machines with the engine in an OFF state.

6. The method of claim 5, wherein operating the single one of the torque machines to generate tractive torque responsive to the output torque request while commanding zero torque output from the other of the torque machines with the engine in the OFF state comprises:

executing an autostop maneuver to place the engine in the OFF state including activating a clutch to ground rotation of the engine; and deactivating the torque transfer clutches configured to transfer torque in the transmission.

7. The method of claim 5, wherein operating the powertrain system in the one-motor EV range responsive to the output torque request including operating only the single one of the torque machines to generate tractive torque responsive to the output torque request comprises operating the powertrain system to generate torque in accordance with the following relationships:

$$Ta = a1*(To) + 0*(Nj\_dot) + c1*(No\_dot) + 0*(Nj) + 0*(No)$$

$$Tb = 0*(To) + b2*(Nj\_dot) + c2*(No\_dot) + d2*(Nj) + e2*(No)$$

wherein Ta is torque of the first torque machine,
Tb is torque of the second torque machine,
To is the output torque request,
Nj_dot is a slip acceleration of a clutch,
No_dot is an acceleration of an output member,
Nj is a slip speed of the clutch,
No is a speed of the output member, and
a1, c1, b2, c2, d2 and e2 are system-specific scalar values, and wherein the first torque machine is the single one of the torque machines to generate tractive torque and the second torque machine is permitted to free-wheel.

8. The method of claim 5, wherein operating the powertrain system in a one-motor EV range responsive to the output torque request including operating a single one of the torque machines to generate tractive torque responsive to the output torque request comprises operating the powertrain system to achieve rotational speeds in accordance with the following relationships:

$$Na = x1*(No)$$

$$Nb = x2*(Nc2) - y2*(No)$$

$$Nc1 = Nc2 + y3*(No)$$

wherein Na is a speed of the first torque machine,
Nb is a speed of the second torque machine,
Nc1 is a slip speed of a first clutch,
Nc2 is a slip speed of a second clutch,
No is a speed of an output member, and
x1, x2, y2 and y3 are system-specific scalar values, and
wherein the first torque machine is the single one of the torque machines to generate tractive torque and the second torque machine is permitted to free-wheel.

* * * * *